Figure 11:
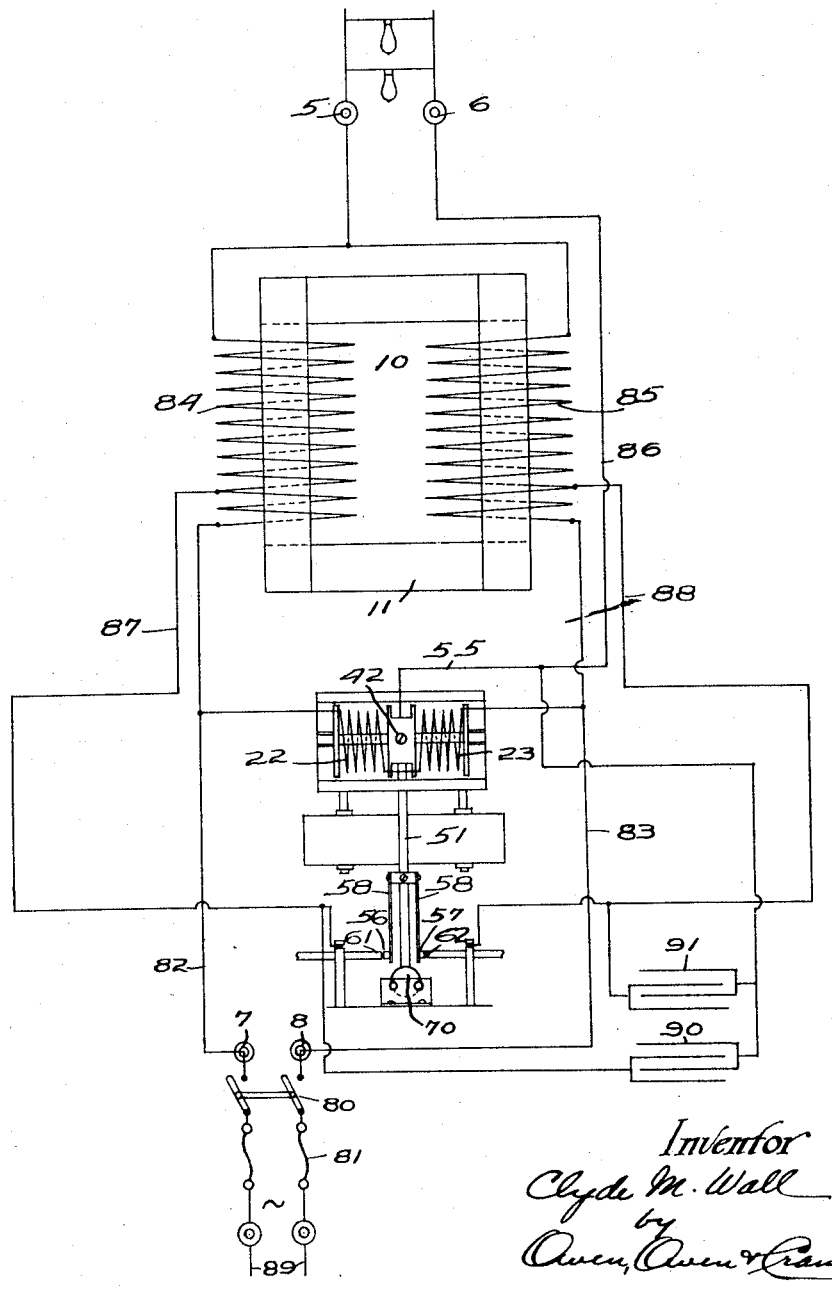

C. M. WALL.
ELECTRICAL RECTIFIER.
APPLICATION FILED DEC. 2, 1915.
1,193,641.
Patented Aug. 8, 1916.
4 SHEETS—SHEET 1.
Fig. 1.
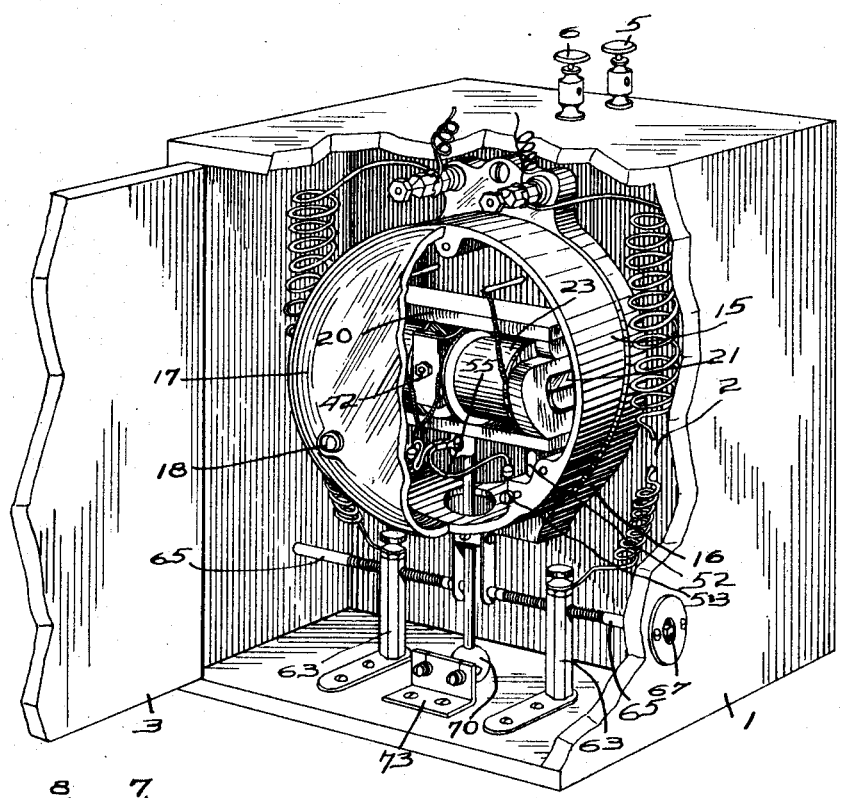
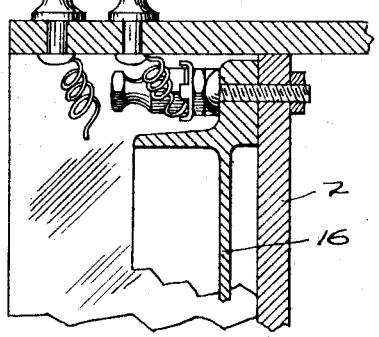
Fig. 2.
Inventor
Clyde M. Wall
by
Owen, Owen & Crampton

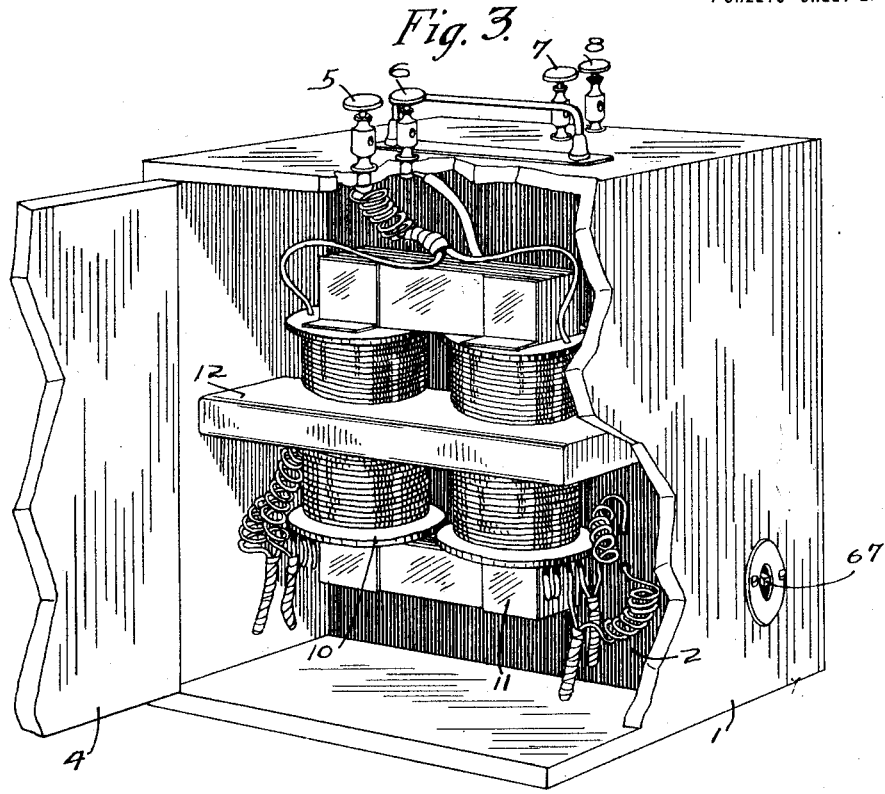

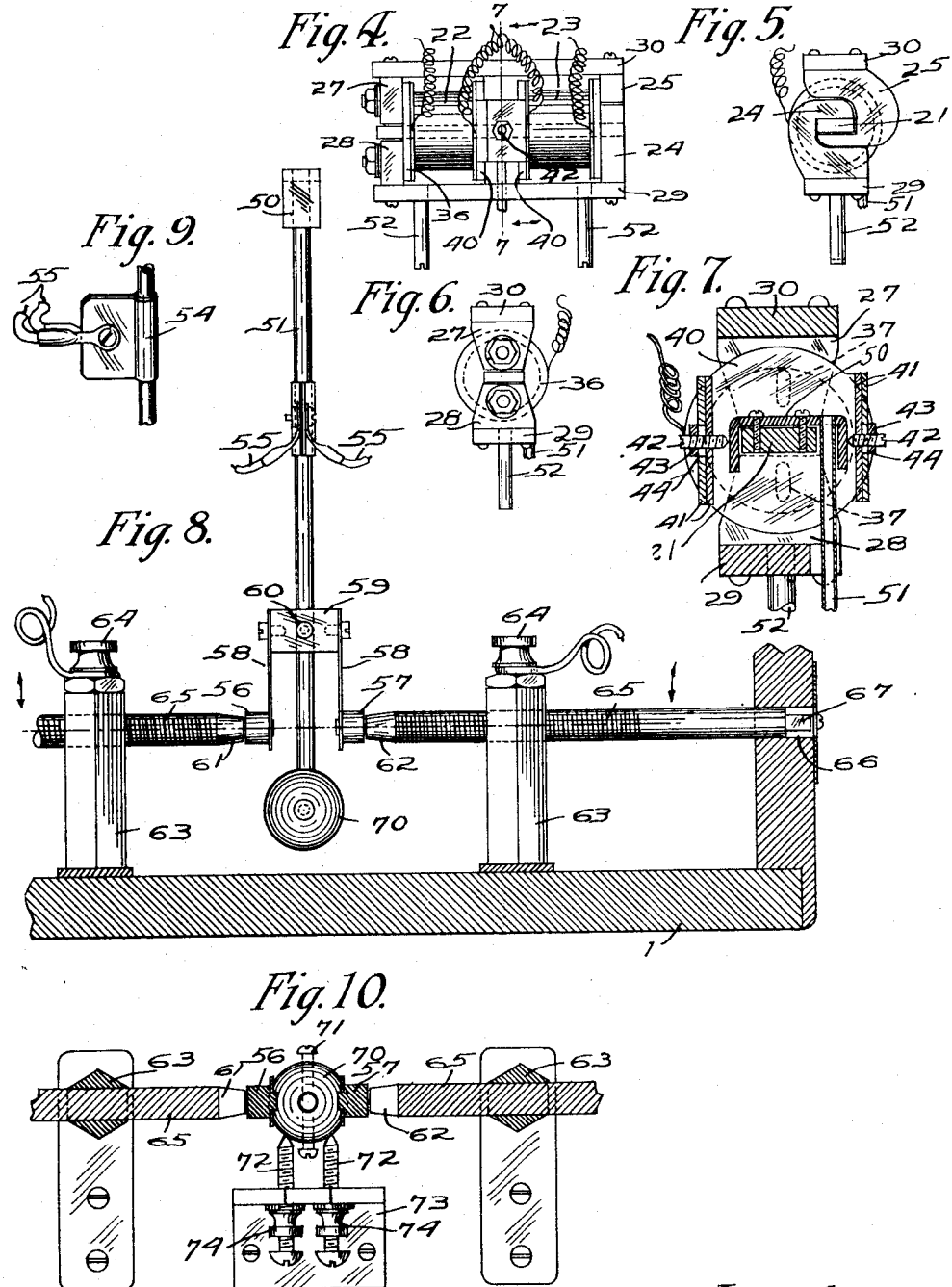

C. M. WALL.
ELECTRICAL RECTIFIER.
APPLICATION FILED DEC. 2, 1915.

1,193,641.

Patented Aug. 8, 1916.
4 SHEETS—SHEET 4.

Inventor
Clyde M. Wall
by
Owen, Owen & Crampton

UNITED STATES PATENT OFFICE.

CLYDE M. WALL, OF TOLEDO, OHIO.

ELECTRICAL RECTIFIER.

1,193,641.  Specification of Letters Patent.  Patented Aug. 8, 1916.

Application filed December 2, 1915. Serial No. 64,681.

*To all whom it may concern:*

Be it known that I, CLYDE M. WALL, a citizen of the United States, and a resident of Toledo, in the county of Lucas and State of Ohio, have invented a certain new and useful Electrical Rectifier; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to rectifiers of alternating electric currents.

It particularly relates to vibrators which change connection between the main line and the consuming system as the alternations of the electric currents occur. The vibrator moves synchronously or in unison with the changes in the current direction in the main line, and consequently directs a uniform current in one direction through the consuming system.

The invention also relates to the adaptation and use of a booster or tapped coil in combination with a commutator or automatic circuit changer.

It also relates to means for causing the vibrator to open and close the circuits in unison with the changes in the current direction.

It also provides an accurate adjusting means for controlling the circuit changing means.

It also provides an efficient contact whereby the circuit may be broken without causing injurious effect upon the contacts.

The invention may be contained in many forms of constructions usable for different purposes, all of which come within the purview of my claims hereinafter appended. To show the practicability of my invention, I have selected one of such constructions as an example and shall describe it hereinafter. The construction selected is illustrated in the accompanying drawings.

Figure 1 illustrates a perspective view of a part of the construction containing my invention. Fig. 2 is an illustration of the detail showing connection of a part of the mechanism. Fig. 3 illustrates a perspective view looking in the direction opposite from that in which the perspective view in Fig. 1 is taken. Fig. 4 illustrates the coils for controlling the vibrator. Fig. 5 illustrates the arrangement of two of the magnetic poles of the vibrator. Fig. 6 illustrates the two other poles of the vibrator and adjusting means for adjusting the intensity of the field of the vibrator. Fig. 7 is a section taken on the line 7, 7 indicated in Fig. 4. Fig. 8 illustrates the vibrator and its contacts. Fig. 9 illustrates the manner in which the circuit is connected to the vibrator. Fig. 10 illustrates a plan view of the vibrator illustrated in Fig. 8. Fig. 11 is a diagrammatic illustration of the rectifier system.

1, Fig. 1 of the drawings, is a container for the parts of the rectifier. The container is divided into two parts or chambers by means of the wall 2. The compartments or chambers are closed by means of the doors 3 and 4. Binding posts 5, 6, 7 and 8 are located on the top of the container. In one compartment is located a booster coil 10 having a laminated core 11. The booster coil is connected by suitable wires with the other devices located in the system as described hereinafter. The vibrator is located in the other compartment of the container 1. The vibrator is contained in greater part in a casing 15 formed of two parts or castings 16 and 17 which may be secured together by means of machine bolts 18 in the manner well known in the art. The vibrator magnet 20 is located in the casing. It is a polarized magnet having permanently magnetized poles. The armature 21 extends through the coils 22 and 23 of the magnet. Poles 24 and 25 are hooked about one end of the armature 21 located within the coils 22 and 23. Also, poles 27 and 28 are located in proximity to the armature 21 at the other end of the coils 22 and 23. The poles 27 and 28 may be made adjustable with reference to the armature 21. The poles 28 and 24 are secured to the field strip 29, while the poles 25 and 27 are secured to the field strip 30. The magnetic effect of the poles upon the armature may be adjusted by adjusting the relation of the poles 27 and 28 with reference to the armature 21. Bolts 35 extend into and are secured in a plate 36; they extend through slots 37 located in the poles 27 and 28. This permits adjustment of the poles relative to the armature 21.

The coils 22 and 23 are secured together by means of magnetic disks 40 which are joined together by overlapping flanges 41 which are secured together by means of bolts 42 and nuts 43. The flanges connected to one of the disks may be provided with slots 44 through which the bolts 42 extend which allow for the adjustment of the coils relative to each other. Intermediate the disks 40 are located the pin bearings for the vibrator. The bolts 42 are provided with sharpened ends which are inserted in point bearings located in the U-piece 50 which is secured to the armature 21. The armature swings between the pivot points of bolts 42 by which it is supported. The reed 51 is also secured in the U-piece 50 and hangs pendantly therefrom. It may be formed of a tubing of brass or other suitable material and extends down through the wall of the casing 15. The position of the reed and the coils may be adjusted by means of rods 52 which are secured in the casing by means of screws 53 at any desired point suitable for the operation of the device.

The reed 51 is connected with the external circuit by means of flexible connecting wires 55. One such connection is sufficient, but two are used in practice in order that the effect on the reed may be substantially the same whichever movement is made by the reed in performing its to and fro operation. A pair of contacts 56 and 57, yieldingly supported on springs 58 which are connected to the reed 51 by means of an adjustable block 59, are operated by the reed 51. The springs 58 allow movement of the reed 51 after the contacts 56 and 57 have completed their movement, that is, have closed connections with their anvils. The block 59 may be secured at the desired point along the reed 51 by means of the screw 60 which extends through the block 59. Coacting fixed contacts 61 and 62 are supported in posts or standards 63 which are secured to the bottom of the container 1. The circuits may be connected with the fixed contacts 61 and 62 by means of the binding posts 64 which are connected with and secured in the standards 63. The contacts 61 and 62 are located on the ends of the rods 65 which are threaded into the standards 63. The rods 65 extend into recesses 66 formed in the walls of the container 1. The rods 65 are provided with square heads 67 and may be operated by means of a suitable key to secure proper adjustment of the rods 65 in the standards 63 so as to properly adjust the contacts 61 and 62 with reference to the contacts 56 and 57.

The contacts 56, 57, 61 and 62 are made of dime silver, that is, the alloy of which the dime is formed. It has been found that heavy currents may be rectified in the use of the dime silver contacts, where platinum contacts and carbon contacts interfere with the operation of the rectifier. This is true, although the circuits containing large currents are opened and no deleterious effects appear by reason of the arcing. Condensers may be used in connection with the circuit breaker if desired, but unusually large currents may be rectified without the use of the condensers. After continued operation the surface remains smooth and the effect of arcing is almost *nil* and the life of the contacts long.

The lower end of the vibrator or reed 51 is provided with a weighted ball 70 which is adjustably secured to the reed 51 by means of screw bolts 71. The movements of the reed are controlled by means of pointed pins or screws 72 which extend in a horizontal plane toward the ball 70 and in vertical planes located in parallel with the plane extending through the reed 51. The points of the screws 72 strike the surface of the ball 70 at points located on each side of the equator passing through the reed 51 so that as the sphere 70 moves with the reed 51, the surface of the ball will strike the points of the screws 72 at an angle which causes the reed slightly to flex and come to a quick though not sudden stop by reason of the friction produced by the glancing effect caused by the ball striking one or the other of the points of the screws 72 which permits the reed to respond accurately to the changes of the current passing through the coils 22 and 23. The screws 72 are secured to a bracket 73. They may be locked in their adjusted positions by means of the nuts 74.

In Fig. 11 is shown the diagrammatic connection of the parts of the rectifier system. The binding posts 7 and 8 are connected with a source of alternating current supply through a suitable switch 80 having fuses 81. The binding posts 7 and 8 are connected by means of wires 82 and 83 with the coils 22 and 23 of the vibrator, and also to the coils 84 and 85 of the booster coil 10. The booster coils 84 and 85 are connected together and to the binding post 5 through the load circuit. The binding post 6 is connected by means of wires 86 and 55 to the reed 51. The coils 84 and 85 are tapped by means of the wires 87 and 88 near their points of connection with the binding posts 7 and 8 and are connected to the fixed contacts 61 and 62. If desired, condensers 90 and 91 may be connected in parallel with the contacts 56 and 61, and 57 and 62, respectively, a terminal of each of the condensers being connected to the reed 51 through the wire 55, while the other terminals of the condensers 90 and 91 are connected with the fixed contacts 61 and 62, respectively. The translating devices are connected with the binding posts 5 and 6, through which the substantially unidirectional current passes.

When the parts are adjusted to cause the reed 51 to move synchronously with the current changes, the switch 80 may be closed which will cause an alternating current to pass through the wires 82, the coils 84, 85 and the wire 83 to the main supply lines 89. The current also passes through the coils 22 and 23 in series which is located in shunt to the coils 84 and 85. The coils 84 and 85 are tapped by the wires 87 and 88 and are connected to the fixed contacts 61 and 62. When the reed 51 moves so as to close the contacts 61 and 56, a circuit will be completed through a portion of the coil 84 and will be opened through a portion of the coil 85 so that a current of certain direction is allowed to flow through the wire 87, the contacts 61 and 56, the wires 55, 86, to the binding posts 6, and returns through the consuming system to the binding post 5 to the portion of the coil 84 which is tapped by the wire 87. When the contacts 57 and 62 are closed, the other pair of contacts are opened and the difference of potential existing between the point of tapping of the coil 85 by the wire 88 and its point of connection with the binding post 5 causes the current to pass through the contacts 57 and 62, wires 55, 86, binding post 6, and to return through the binding post 5 to that portion of the coil 85 which is tapped by means of wire 88. The reed continues to vibrate in unison with the current changes, producing thereby unidirectional current through the binding posts 5 and 6 and the system connected therewith.

The construction selected and described may be greatly modified in the arrangement and manufacture of its parts and in the substitution of elements having equivalent functions, and such modifications may be used for many varied purposes and still contain the invention.

Having thus described my invention, what I claim as new, and desire to secure by Letters Patent, is—

1. A vibrator for current rectification having a reed, a spherical body located near the free end of the reed and having adjusting points extending in a direction transverse to the movement of the spherical body and located on each side of the equator of the spherical body.

2. In a vibrator for the rectification of electric currents having a magnetic coil, an armature extending through the coil, a pair of poles located in proximity to the armature at each end of the armature, the armature and the coils permanently magnetized, means for pivotally supporting the armature centrally and between the coils, the poles at one end of the field hooked to one side of the armature to cause coaction of the poles with respect to the central pivot point of the armature, and means for adjusting one pair of poles.

3. In a vibrator for the rectification of electric currents having a magnetic coil, an armature extending through the coil, two pairs of poles located in proximity to the armature, a pair at each end, the poles permanently magnetized, means for pivotally supporting the armature centrally and between the coils, the poles at one end of the field hooked to one side of the armature to cause coaction of the poles with respect to the central pivot point of the armature, means for adjusting one pair of poles, a sphere connected to the reed, and adjusting pins having points extending in a direction transverse to the direction of movements of the sphere by the operation of the reed and on each side of the equator extending transverse to the direction of movement of the sphere.

4. A vibrator for current rectification having a reed, a body located near the free end of the reed and having surfaces inclined to the direction in which the reed oscillates, adjusting points extending in a direction transverse to the movement of the body and located on each side of the body so as to limit the movements of the reed by striking the inclined surfaces of the body.

In testimony whereof, I have hereunto signed my name to this specification.

CLYDE M. WALL.